United States Patent
Kim

(10) Patent No.: US 8,927,625 B2
(45) Date of Patent: Jan. 6, 2015

(54) RESIN SYRUP, ARTIFICIAL MARBLE CONTAINING A HARDENED FORM OF THE RESIN SYRUP, AND A PRODUCTION METHOD FOR THE SAME

(75) Inventor: Hang Young Kim, Chungcheongbuk-do (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 13/121,890

(22) PCT Filed: Sep. 4, 2009

(86) PCT No.: PCT/KR2009/004993
§ 371 (c)(1),
(2), (4) Date: Mar. 30, 2011

(87) PCT Pub. No.: WO2010/041819
PCT Pub. Date: Apr. 15, 2010

(65) Prior Publication Data
US 2011/0178228 A1    Jul. 21, 2011

(30) Foreign Application Priority Data

Oct. 8, 2008    (KR) .......................... 10-2008-0098713

(51) Int. Cl.
*B44F 9/04*    (2006.01)
*C08F 265/06*    (2006.01)

(52) U.S. Cl.
CPC .................................. *C08F 265/06* (2013.01)
USPC ......................................... 523/171; 524/437

(58) Field of Classification Search
CPC ............ C04B 2111/00; C04B 2111/54; C04B 2111/542; C04B 2111/545
USPC ......................................... 523/171; 524/437
See application file for complete search history.

(56) References Cited

U.S. PATENT DOCUMENTS

| | | | |
|---|---|---|---|
| 5,415,931 A | 5/1995 | Minghetti et al. | |
| 5,985,972 A | 11/1999 | Minghetti | |
| 6,451,910 B1 * | 9/2002 | Koyanagi et al. | 524/854 |
| 6,624,226 B1 | 9/2003 | Servaty et al. | |
| 6,822,058 B1 * | 11/2004 | Kramer et al. | 526/142 |

FOREIGN PATENT DOCUMENTS

| | | |
|---|---|---|
| JP | 11-166021 | 3/1999 |
| JP | H11-511406 A | 10/1999 |
| JP | 2000-080114 | 3/2000 |
| JP | 3123419 B2 * | 1/2001 |
| JP | 2004-018694 | 1/2004 |
| JP | 2004-352733 | 12/2004 |
| KR | 10-0384436 B1 | 5/2003 |
| WO | 96-26977 | 9/1996 |
| WO | 97-10945 | 3/1997 |
| WO | WO 00/12281 | 3/2000 |

OTHER PUBLICATIONS

Velazquez R, et al., "Morphology-Composition-Processing Relationships in poly(methyl methacrylate)Polytriethylene Glycol Dimethacrylate Shrinkage-Controlled Blends", Journal of Applied Polymer Science, accepted May 19, 2003, vol. 91, pp. 1254-1260, ISSN 0021-8995.

* cited by examiner

*Primary Examiner* — Nicole M Buie-Hatcher
*Assistant Examiner* — Chelsea M Lowe
(74) *Attorney, Agent, or Firm* — McKenna Long & Aldridge, LLP

(57) ABSTRACT

The present invention relates to resin syrup, which comprises a high-molecular-weight acrylic material containing a carboxyl group, and comprises a room-temperature-curing initiator and a high-temperature-curing initiator, and it also relates to an artificial marble containing a hardened form of the resin syrup, and to a production method for the same. The present invention can provide resin syrup having outstanding curing efficiency and a viscosity suitable for press molding by a process such as maturation because of the inclusion of the high-molecular-weight acrylic material containing a carboxyl group, the room-temperature-curing initiator, and the high-temperature-curing initiator, and it can provide an artificial marble containing a hardened form of the resin syrup, and a production method for the same.

8 Claims, No Drawings

RESIN SYRUP, ARTIFICIAL MARBLE CONTAINING A HARDENED FORM OF THE RESIN SYRUP, AND A PRODUCTION METHOD FOR THE SAME

This application is a National Stage Entry of International Application No. PCT/KR2009/004993, filed Sep. 4, 2009, and claims the benefit of Korean Application No. 10-2008-0098713, filed on Oct. 8, 2008, which is hereby incorporated by reference for all purposes as if fully set forth herein.

TECHNICAL FIELD

The present invention relates to resin syrup, an artificial marble containing a hardened form of the resin syrup, and a method for producing the same.

BACKGROUND ART

Artificial marble used as all sort of interior materials/exterior materials, such as a kitchen countertop, flooring material, and the like can be largely divided into an inorganic-based artificial marble and a resin-based artificial marble. A type of the resin-based artificial marble from among these can be classified into an acryl-based artificial marble, unsaturated polyester-based artificial marble, and the like according to the used resins.

The acryl-based artificial marble takes up most of the artificial marble market because it has advantages, such as an excellent mechanical strength, the ability to express a beautiful color, an excellent thermal resistance, and the like, as compared with the unsaturated polyester-based artificial marble.

Generally, the acryl-based artificial marble is being produced by dissolving a high-molecular-weight acrylic material (ex. Polymethylmethacrylate (PMMA)) having about 100,000 of a weight average molecular weight in a curable monomer (ex. Methyl methacrylate (MMA)), and then applying the composition (resin syrup) prepared by mixing an additive, such as inorganic filler into a casting process that is a continuous way.

Meanwhile, for producing the acryl-based artificial marble, when using a pressing process, it can prepare products having various shapes as compared with that prepared using a casting process, and it has advantages such that the product produced from the pressing process has an excellent modification resistance, and it can be easily molded to a thin film product.

Therefore, if the composition having an acryl-based resin as a main component can be applied to the press molding, it is expected that the product having more excellent physical properties can be produced, that is, the product has both advantages of the acryl-based resin and the pressing process.

However, despite the advantages of the pressing process as mentioned above, the reason for producing the existed acryl-based artificial marble using the casting process is that the viscosity of the composition having the acryl-based resin as a main component is hard to increase to the level that can possible to apply the pressing process.

For example, when the content of the inorganic filler is increased in order to increase the viscosity of the resin composition, there were disadvantages such that the removing of bubbles is impossible, and the strength and the surface quality of the molded product are very deteriorated because the flowability has very become worse, with the increase of the viscosity.

DISCLOSURE

Technical Problem

An object of the present invention is to provide resin syrup that can be applied to a press-molding by solving the problems about the low viscosity of the resin syrup containing a high-molecular-weight acrylic material as a main component, in order to solve the existed technique problems as mentioned above.

Another of the present invention is to provide an artificial marble containing the resin syrup and a method for producing the same.

Technical Solution

The present invention provides resin syrup, which comprises a high-molecular-weight acrylic material containing a carboxyl group; and a room-temperature-curing initiator and a high-temperature-curing initiator as a mean for solving the above objects.

The present invention provides an artificial marble including a hardened form of the resin syrup according to the above-mentioned present invention as a mean for solving the above objects.

The present invention provides a method for producing an artificial marble, comprising a first step of maturing the resin syrup according to the above-mentioned present invention; and a second step of press molding the resin syrup matured from the first step, as a mean for solving the above objects.

Advantageous Effects

The present invention can provide the resin syrup that can be applied to a press molding by adding a room-temperature-curing initiator and a high-temperature-curing initiator to the resin syrup dissolved with a high-molecular-weight acrylic material containing a carboxyl group, and optimizing the viscosity through a maturing process, and the like.

Therefore, the present invention has advantages such that the products having various shapes can be produced at once, the products produced have an excellent modification resistance, and an acryl-based molded product (ex. Artificial Marble) can be produced by applying a pressing process that can be possible to easily mold a thin film product.

BEST MODE

The present invention relates to resin syrup, which comprises a high-molecular-weight acrylic material containing a carboxyl group; a room-temperature-curing initiator; and a high-temperature-curing initiator.

The present invention is characterized by making an acryl-based resin syrup to be possible to apply for a pressing process, but the acryl-based resin syrup has been mostly applied only to a casting process due to the problems, such as, its low viscosity and contractibility.

Therefore, the present invention has advantages such that the products having various shapes can be produced at once, the products produced have an excellent defoaming resistance (the property of the modification resistance), and an acryl-based molded product (ex. Artificial Marble) can be produced by applying a pressing process that can be possible to easily mold a thin film product.

Hereinafter, the resin syrup of the present invention will be described in detail.

The resin syrup according to the present invention includes a high-molecular-weight acrylic material containing a carboxyl group. The carboxyl group included in the high-molecular-weight material may play a role in increasing a viscosity of the resin syrup by reacting with a thickener (metallic oxide or metallic hydroxide) that may be included in the resin syrup.

The present invention may control properly an acid value of the high-molecular-weight material in order to obtain the effect of increasing the desired viscosity by controlling the reaction of the carboxyl group and the thickener.

The term, [an acid value] used for the present invention is a value for indicating the content of the carboxyl group in the high-molecular-weight material, and means a mass (mg) of potassium hydroxide required for neutralizing 1 g of the high-molecular-weight material.

Specifically, the present invention may use a high-molecular-weight acrylic material having more than 14 of the acid value, and more preferably a high-molecular-weight acrylic material having more than 18 of the acid value. When the acid value is below 14, it is possible that the effect on increasing the viscosity of the composition may be deteriorated due to the reaction with the thickener. The upper limit of the acid value for the present invention is not limited, especially, and for example may be 30.

Meanwhile, [a high-molecular-weight acrylic material] according to the present invention may be used as the concept containing a polymer or oligomer produced with a general acryl-based monomer as a main component.

For the present invention, the weight average molecular weight of the high-molecular-weight acrylic material may preferably be 300,000 to 3,000,000. When the weight average molecular weight is below 300,000, it is possible that the flowability of the resin syrup may be excessively increased due to the decrease of the effect on enhancing the viscosity; and when the weight average molecular weight excesses 3,000,000, it is possible that the removing of the bubbles that are generated in the mixing process may be difficult or the formability may be excessively decreased because the viscosity enhancing speed is excessively quickened.

The high-molecular-weight acrylic material according to the present invention can be produced by co-polymerizing the monomer containing the carboxyl group to the acryl-based monomer as a main component.

The acryl-based monomer used for the above process may be one or more monomer selected from the group consisting of methyl (metha)acrylate, ethyl (metha)acrylate, butyl (metha)acrylate, 2-ethylhexyl (metha)acrylate, benzyl (metha)acrylate and glycidyl (metha)acrylate; and the monomer containing the carboxyl group may be one or more selected from the group consisting of (metha)acrylic acid, itaconic acid, crotonic acid, maleic anhydride and fumaric acid; but they are not limited thereto.

The rates of use of the acryl-based monomer and the monomer containing the carboxyl group as mentioned above are not limited, especially, but the person who has a skill in the art can select easily the proper rate of the monomer according to the acid value of the desired high-molecular-weight material.

In addition, the method for co-polymerizing as mentioned above is not limited, especially, but can use a general method, such as a bulk polymerization, a solution polymerization, a suspension polymerization or an emulsion polymerization, without limitation.

The high-molecular-weight acrylic material as mentioned above is preferably included in 10 to 40 parts by weight in 100 parts by weight of total resin syrup according to the present invention. When the content is below 10 parts by weight, it is possible that the curing physical property and/or the contractibility of the resin syrup may be decreased; and when the content excesses 40 parts by weight, it is possible that the viscosity of the resin syrup may be increased thereby declining a workability.

The resin syrup according to the present invention includes a room-temperature curing initiator together with the high-molecular-weight acrylic material.

The term, [the room-temperature curing initiator] used for the present invention means the initiator that can initiate the curing reaction at a temperature of about 20° C. to 50° C., and the component is concerned with the semi-curing process and/or the maturation of the resin syrup so that it can play a role in increasing the viscosity to a certain level.

A type of the room-temperature curing initiator that can be used for the present invention is not limited, especially, if it is one that may be the general one used for the room-temperature curing of the acryl-based resin syrup as the one that can play a role in performing the above mentioned function. The examples may include t-butylperoxymaleic acid, benzoyl peroxide, and the like, but is not limited thereto.

The room-temperature curing initiator as mentioned above may be preferably included in 0.05 parts by weight to 5 parts by weight in 100 parts by weight of the resin syrup according to the present invention. When the content of the room-temperature curing initiator is not within the above range, it is possible that the proper viscosity cannot be controlled because the curing reaction is excessively performed or insignificantly performed during the semi-curing or maturing process.

Also, the resin syrup according to the present invention may further include a proper accelerator that can assist the curing reaction of the room-temperature curing initiator.

Example of the above accelerator includes one more or two more of metallic hydroxide (ex. Calcium hydroxide), tertiary amine, and metal salt (ex. Cobalt salt), but is not limited thereto.

In addition, when the accelerator is included in the resin syrup, the content may be 0.1 parts by weight to 1 part by weight based on 100 parts by weight of the resin syrup. When the content of the accelerator is not within the above range, it is possible that the proper viscosity cannot be controlled because the curing reaction is excessively performed or insignificantly performed during the semi-curing or maturation process.

Also, the resin syrup according to the present invention includes a high-temperature curing initiator.

The term, [the high-temperature curing initiator] used for the present invention means the initiator that can cause the curing reaction according to the heat at a temperature of above 100° C., and the component can play a role in improving the curing efficiency, and the like when the resin syrup after terminating the maturation and/or the semi-curing processes is applied to the process, such as the press molding, and the like.

A type of the high-temperature curing initiator that can be used for the present invention is not limited, especially, if it is the one having more than 100° C. that is a half-life of 10 hours, as the one that can perform the above mentioned function. Example of them includes one more or two more mixtures of t-butylperbenzoate, t-butylperisopropylcarbonate, t-butylper-2-ethylhexanoate, 1,1-di-t-butylper-2,2,5-trimethylcyclohexane, and the like, but is not limited thereto.

The high-temperature-curing initiator as mentioned above may be in the amount of 0.1 parts by weight to 5.0 parts by weight in 100 parts by weight of the resin syrup according to the present invention, and preferably in the amount of 0.5 parts by weight to 2.0 parts by weight. When the content of the high-temperature curing initiator is not within the above range, it is possible that the curing efficiency may be decreased during the applying of the press molding of the resin syrup.

The resin syrup according to the present invention may further include the thickener that can increase the viscosity of the resin syrup by reacting the carboxyl group included in the high-molecular-weight acrylic material along with the above-mentioned components.

A type of the thickener may include all sorts of metallic oxide or metallic hydroxide, but is not limited thereto.

A specific example of the metallic oxide or metallic hydroxide may include one or more selected from the group consisting of magnesium oxide, calcium oxide, magnesium hydroxide and calcium hydroxide, but is not limited thereto.

The metallic oxide or metallic hydroxide as mentioned above may be preferably included in the amount of 1 part by weight or 10 parts by weight based on 100 parts by weight of the resin syrup according to the present invention. When the content of the thickener is below 1 part by weight, it is possible that the viscosity increase efficiency may be decreased; and when the content of the thickener excesses 10 parts by weight, it is possible that yellowing and/or strength decrease phenomenon may be caused on the product produced.

The resin syrup according to the present invention may further include a thermoplastic resin for giving the effect on increasing the viscosity through the monomer absorption and at the same time, decreasing the product contraction.

The weight average molecular weight and the glass transition temperature of the thermoplastic resin are not limited especially, but for example, the weight average molecular weight may be 300,000 to 3,000,000 and the glass transition temperature may be 70 to 120° C.

Also, a type of the thermoplastic resin is not limited, especially, if it is the one that can have an effect on increasing the viscosity and at the same time implementing an effect on preventing the product contraction in the resin syrup according to the present invention. For example, polystyrene (PS), polyvinyl acetate (PVA), polymethylmethacrylate (PMMA), and the like may be used, and specifically, PMMA may be used in terms of the transparency and dispersibility after curing.

The content of the thermoplastic resin is not limited especially, but for example may be in the amount of 5 to 50 parts by weight based on 100 parts by weight of total resin syrup. When the content of the thermoplastic resin is below 5 parts by weight, it is possible that the contraction phenomenon may be occurred due to an insignificant effect on preventing the product contraction; and when the content of the thermoplastic resin excesses 50 parts by weight, it is possible that the expansion may be occurred rather than the contraction and the viscosity may be excessively increased after curing.

Also, the resin syrup according to the present invention may further include the inorganic filler of 100 parts by weight or 300 parts by weight based on 100 parts by weight of the resin syrup. The inorganic filler may improve the surface smoothness by preventing the contraction phenomenon when molding the resin syrup and may play a role in increasing hardness.

Example of the inorganic filler that can be used for the present invention may include one or more selected from the group consisting of silica, aluminum hydroxide, calcium carbonate, barium sulfate, talc, alumina, and mica, but is not limited thereto.

In addition, the present invention may use the filler after the treatment of the surface using a silane coupling agent, and the like so that the filler can be possible to chemically bond with the resin component.

In addition, the resin syrup according to the present invention may further include a cross-linking agent of 0.5 parts by weight to 10 parts by weight based on 100 parts by weight of the resin syrup in terms of improving a thermal resistance, a chemical resistance, and the like of the product.

The cross-linking agent that can be used at this time may include a multi-functional acrylate, such as diethyleneglycol dimethacrylate, propyleneglycol di(metha)acrylate, 1,3-butyleneglycol di(metha)acrylate, 1,4-butyleneglycol di(metha)acrylate, 1,6-hexanediol di(metha)acrylate, dimethylrolethane di(metha)acrylate, 1,1-dimethylrolpropane di(metha)acrylate, 2,2-dimethylrolpropane di(metha)acrylate, trimethylrolethane tri(metha)acrylate, trimethylrolpropane tri(metha)acrylate or tetramethylrolmethane tri(metha)acrylate; or (metha)acrylic acid, and the like, but is not limited thereto.

When the content of the cross-linking agent is below 0.5 parts by weight, it is possible that the strength of the hardened form may be not sufficient; and when the content of the cross-linking agent excesses 10 parts by weight, it is possible that the monomer may be boiled or the crack of the product may be occurred because the curing of the syrup is excessively proceeded.

In addition, the resin syrup according to the present invention may further include properly one or more selected from the group consisting of a chain-transferring agent, a defoaming agent, a pigment, a dye, a coupling agent, an internal releasing agent, UV stabilizer, a polymerization inhibitor, a contraction resistance and a chip (ex. Resin chip, natural material chip, and the like) to the above-mentioned component.

A method for producing the resin syrup according to the present invention by using the above components is not limited especially. Generally, the resin syrup may be produced by dissolving the proper high-molecular-weight material to the reactive monomer, and the resin syrup according to the present invention can be also produced by the same method.

A type of the monomer that can be used at this time is not limited especially, and for example may include an acryl-based monomer, a vinyl-based monomer, and the like. Specifically, it may use (metha)acrylic acid ester-based monomer having alkyl group of carbon number 1 to 20, the monomer, such as cyclohexyl (metha)acrylate, glycidyl (metha)acrylate, hydroxyalkyl (metha)acrylate, benzyl (metha)acrylate, and the like, or the monomer, such as ethylene, vinyl chloride, vinyl fluoride, 1,3-butadiene, styrene, α-methylstyrene, vinyl ester, acrylic acid, N-vinylpyrrolidone, dichloroethene, chlorostyrene, acrylonitrile, and the like.

In addition, more specifically, (metha)acrylate having alkyl group of carbon number 1 to 12 may be used; even more specifically, (metha)acrylate having alkyl group of carbon number 1 to 8 may be used; and preferably, methyl (metha)acrylate may be used.

The acryl-based monomer as mentioned above may preferably be included in the amount of 50 parts by weight to 100 parts by weight in the resin syrup according to the present invention. When the content is smaller than 50 parts by weight, it is possible that the workability is decreased due to the high viscosity; and when the content excesses 100 parts by weight, it is possible that the characteristics, such as the curing physical property, the contractibility of the composition, and the like are decreased.

The resin syrup of the present invention produced as mentioned above may preferably have the viscosity within the range of 500 cps to 20,000 cps. When the viscosity is below 500 cps, it is possible that the efficiency for applying on the pressing process is decreased; and when the viscosity excesses 20,000 cps, it is possible that the handling of syrup becomes difficult or the efficiency of de-foaming, and the like is deteriorated.

In addition, the present invention relates to an artificial marble including the hardened form of the resin syrup according to the present invention as mentioned above.

For example, the present invention can provide the artificial marble having the advantages of the acryl-based resin and the pressing process by producing the artificial marble through the pressing process using the resin syrup containing each component as mentioned above, of which the viscosity is optimized.

The method for producing the artificial marble in the present invention is not limited, especially. For example, the artificial marble may be produced by using the method comprising: a first step of maturing the resin syrup according the present invention as mentioned above; and a second step of press molding the matured resin syrup from the first step.

The first step of the present invention is to mature so that the resin syrup according to the present invention as mentioned above has the viscosity suitable for the press molding. The method for maturing the resin syrup in the first step of the present invention is not limited, especially.

For example, the first step may include (1) treating the resin syrup at a temperature of 50° C. to 70° C. for 1 hour to 3 hours; and (2) treating the resin syrup at a temperature of 20° C. to 40° C. since the above step (1).

The step (1) is to semi-curing the syrup before maturing the resin syrup. The method for semi-curing as mentioned above is not limited, especially, and for example, the method for increasing the temperature in an oven or a maturing room after seal-packaging of the resin syrup may be performed as a proper method.

In addition, the method for performing the above step (2) is not limited, especially, and for example, the method for maintaining the resin syrup in a state of controlling a temperature inside maturing room since the above step (1) may be performed.

At this time, the time for performing the maturing process of the step (2) may be properly selected considering the viscosity of the resin syrup, and for example, it may be performed for 12 hours to 50 hours. However, the above condition is only one example of the present invention. That is, the present invention can perform a further maturing at the same condition or can properly change the condition, such as the maturing temperature, and the like when the viscosity of the composition does not belong to the desired range after maturing as mentioned above.

The second step of the present invention is to produce the artificial marble by applying the resin syrup having an optimized viscosity through the first step to the pressing process. The above press molding can produce the molding product having various shapes at a time as compared with the casting process that is a continuous process. In addition, there are advantages such that the modification resistance property of the produced product is excellent and also the molding of the thin film product is favorable.

The method for press molding in the second step of the present invention is not limited, especially, and the person who has a skill in the art can easily select the proper condition for press molding according to the desired artificial marble.

For example, the second step of the present invention can select the molding by injecting the proper press mold after measuring the composition performed from maturing in the first step.

The press molding in the above step may be performed at a molding temperature of 90° C. to 110° C. and at a molding pressure of 20 to 50 psi/cm$^2$ for 10 minutes to 20 minutes, but is not limited thereto.

The method for producing the artificial marble according to the present invention may produce the artificial marble by cooling and de-molding the product after the pressing process as mentioned above, and then may further performed an after-treating process, such as sanding and/or cutting press according to the application.

Hereinafter, the embodiment of the present invention will be described in more detail with reference to Example, but the range of the present invention is not limited to the following Example.

EXAMPLE 1

A resin syrup was produced by adding 25 parts by weight of poly(methylmethacrylate) (PMMA) containing carboxyl group having an acid value of 15 and a weight average molecular weight of 300,000 to 75 parts by weight of methyl methacrylate (MMA).

100 parts by weight of the produced resin syrup was mixed with 150 parts by weight of aluminum hydroxide, 200 parts by weight of acryl-based resin chip, 0.5 parts by weight of normal mercaptane, 0.1 parts by weight of silicon defoaming agent, 10 parts by weight of PMMA (weight average molecular weight: 1,000,000), 5 parts by weight of diethyleneglycoldimethacrylate and 2 parts by weight of magnesium oxide (MgO).

Subsequently, the resin syrup was further mixed with 0.2 parts by weight of calcium hydroxide, 0.5 parts by weight of t-butylperoxymaleic acid and 1.0 parts by weight of t-butylperbenzoate.

Subsequently, the produced resin syrup was sealed and then matured in an oven at 50° C. for 2 hours, and then further matured at a room temperature for 1 day. Since then, an adequate amount of the resin syrup was weighed; then injected to a mold; molded at 100° C. and a molding pressure of 30 psi/cm$^2$ for 15 minutes; and then cooled and de-molded to produce an artificial marble.

The invention claimed is:
1. Resin syrup comprising:
a high-molecular-weight acrylic material containing a carboxylic acid group;
a room-temperature-curing initiator;
a high-temperature-curing initiator;
a thickener; and
a thermoplastic resin,
wherein the high-molecular-weight acrylic material containing the carboxylic acid group has more than 14 of an acid value,
wherein the high-molecular-weight acrylic material has 300,000 to 3,000,000 of a weight average molecular weight,
wherein the high-molecular-weight acrylic material is included in an amount of 10 parts by weight to 40 parts by weight based on 100 parts by weight of the resin syrup,
wherein the room-temperature-curing initiator is included in an amount of 0.05 parts by weight to 5 parts by weight based on 100 parts by weight of the resin syrup, wherein the high-temperature-curing initiator is included in an amount of 0.1 parts by weight to 5.0 parts by weight based on 100 parts by weight of the resin syrup, wherein the thickener is included in an amount of 1 part by weight to 10 parts by weight based on 100 parts by weight of the resin syrup;

wherein the viscosity of the resin syrup is 500 cps to 20,000 cps;

wherein the room-temperature-curing initiator is one or more selected from the group consisting of t-butyl peroxymaleic acid and benzoyl peroxide; and wherein the high-temperature-curing initiator is one or more selected from the group consisting of t-butyl perbenzoate, t-butyl perisopropylcarbonate, t-butylper-2-ethylhexanoate, and 1,1-di-t-butylper-2,2,5-trimethylcyclohexane.

2. The resin syrup according to claim 1, further comprising one or more accelerator selected from the group consisting of metallic hydroxide, tertiary amine, and metal salt.

3. The resin syrup according to claim 1, wherein the thickener is one or more selected from the group consisting of magnesium oxide, calcium oxide, magnesium hydroxide, and calcium hydroxide.

4. The resin syrup according to claim 1, further comprising one or more additives selected from the group consisting of inorganic filler, cross-linking agent, chain-transferring agent, defoaming agent, pigment, dye, coupling agent, internal releasing agent, UV stabilizer, polymerization inhibitor, contraction resistance and chip.

5. An artificial marble comprising a hardened form of the resin syrup according to claim 1.

6. A method for producing an artificial marble, comprising:
a first step of maturing the resin syrup according to claim 1; and
a second step of press molding the resin syrup matured from the first step.

7. The method according to claim 6, wherein the first step include: (1) treating the resin syrup at a temperature of 50° C. to 70° C. for 1 hour to 3 hours; and (2) treating the resin syrup at a temperature of 20° C. to 40° C. since the above step (1).

8. The method according to claim 6, wherein the press molding in the above second step is performed at a molding temperature of 90° C. to 110° C. and at a molding pressure of 20 to 50 psi/cm$^2$ for 10 minutes to 20 minutes.

* * * * *